(12) United States Patent
Bag

(10) Patent No.: US 11,258,850 B2
(45) Date of Patent: Feb. 22, 2022

(54) DISTRIBUTED REGISTER INTELLIGENT NODE TRANSFER ENGINE

(71) Applicant: BANK OF AMERICA CORPORATION, Charlotte, NC (US)

(72) Inventor: Prasad Balkrishna Bag, Maharashtra (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 16/913,017

(22) Filed: Jun. 26, 2020

(65) Prior Publication Data
US 2021/0409490 A1    Dec. 30, 2021

(51) Int. Cl.
| H04L 29/08 | (2006.01) |
| G06N 5/04 | (2006.01) |
| G06N 20/00 | (2019.01) |
| G06F 9/30 | (2018.01) |
| H04L 29/06 | (2006.01) |

(52) U.S. Cl.
CPC ........ *H04L 67/1063* (2013.01); *G06F 9/3012* (2013.01); *G06N 5/04* (2013.01); *G06N 20/00* (2019.01); *H04L 63/0876* (2013.01); *H04L 63/102* (2013.01); *H04L 63/12* (2013.01); *H04L 67/1078* (2013.01); *H04L 67/1091* (2013.01); *H04L 67/22* (2013.01)

(58) Field of Classification Search
CPC . H04L 67/22; H04L 67/1063; H04L 67/1078; H04L 67/1091; H04L 63/12; H04L 63/102; H04L 63/0876; G06N 20/00; G06N 5/04; G06F 9/3012
See application file for complete search history.

(56) References Cited

U.S. PATENT DOCUMENTS

| 11,012,228 B2 * | 5/2021 | Mercuri | G06F 9/546 |
| 2019/0266145 A1 | 8/2019 | Qiu et al. | |
| 2019/0349426 A1 * | 11/2019 | Smith | H04L 67/104 |
| 2020/0092091 A1 * | 3/2020 | Muller | G06F 16/27 |

* cited by examiner

*Primary Examiner* — Azizul Choudhury
(74) *Attorney, Agent, or Firm* — Moore & Van Allen PLLC; Nicholas C. Russell

(57) ABSTRACT

Embodiments of the invention are directed to an architecture modifier for intelligent node transfer and review processing. The engine collects user activity data from IoT devices and non-IoT applications to identify user activity and stores user workstation availability metrics. Upon receiving a request for review and consensus, the engine develops various user data routing configuration and schema based on live data feed for identification of nodes for transaction consensus and immediate review posting without any delay architectural delay.

17 Claims, 9 Drawing Sheets

DISTRIBUTED REGISTER INTELLIGENT NODE TRANSFER ENGINE

BACKGROUND

Distributed registers are a growing, highly-adaptive new technology already being implemented across multiple industries. Due to the unique characteristics inherent to the distributed register structure, users must approve transactions for the transactions to be saved as a block on the register. However, sometimes users are not immediately available for approval of the transaction, thus a delay occurs in the posting of the transaction on the resister. As a result, there exists a need for a new distributed register architecture that overcomes the challenges of the conventional posting methods.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In distributed register network systems, transaction will be to passed to all node users from block chain. In case of private distributed registers, if user nodes are spread across multiple locations and various countries then immediate responses from each node is challenging. A delay in transaction completion is not acceptable in every scenario.

The invention collects user activity data from Internet-of-Things (IoT) devices and non-Internet-of-Things (non-IoT) applications to identify user activity and stores the activity within a database. The IoT devices may include cameras, card scanners, alarm clocks, weather updates, and the like associated with a user at a user place of employment or a user place of validation of a block on the distributed registry. The non-IoT applications may include any applications such as outside applications, computer applications, or the like. The system then develops various user data routing configuration and schema based on live data feed for identification of user nodes for transaction consensus and posting on a private distributed register.

As such, the intelligent node data transfer engine receives transaction from any node and utilizes the artificial intelligence (AI) data aggregator engine to dynamically identify and communicate to a list of user nodes who can complete the transaction without any delay.

For new transaction request types whose user prediction data is not available from system data, the intelligent node data transfer engine directly extracts users from various IoT device data, non-IoT applications, and from workstation activities to complete the transaction without any delay. The system saves each transaction, user node details, and user responses in a database for future predictions for block consensus and position. Furthermore, if required the system may operate offline or online given the transaction requirements.

Embodiments of the present invention address these and/or other needs by providing an innovative system, method and computer program product for intelligent node transfer, the invention comprising: communicating with Internet-of-Things (IoT) devices and non-IoT applications associated with a user and a user workstation; storing user data associated with the IoT devices and non-IoT applications for identification of availability for review; receiving a request requiring immediate review and consensus for posting; generating a user data routing configuration and schema based on the stored user data and real-time data extracted from the IoT devices and the non-IoT applications; assigning permission, upon authentication, for user review of the request for posting; and posting, upon user review, the request to a register.

In some embodiments, the user data routing configuration and schema is a transmission list of users available and authorized for reviewing the request immediately.

In some embodiments, storing user data associated with the IoT devices and non-IoT applications for identification of availability for review further comprises performing machine learning analytics on the user data to identify trends in user availability at the user workstation based on time of day and day of week.

In some embodiments, receiving the request requiring immediate review and consensus for posting further comprises receiving a request for posting a transaction on a private distributed resister network system.

In some embodiments, the invention further comprises an intelligent node data transfer engine for receiving the requests from any node and communicating to the assigned permission user the request.

In some embodiments, the invention further comprises an artificial intelligence (AI) data aggregator engine to dynamically identify a list of user nodes comprising users that can complete the transaction without any delay and store that list via the user data routing configuration and schema.

In some embodiments, the user workstation comprises a device and a location where the user provides reviews.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
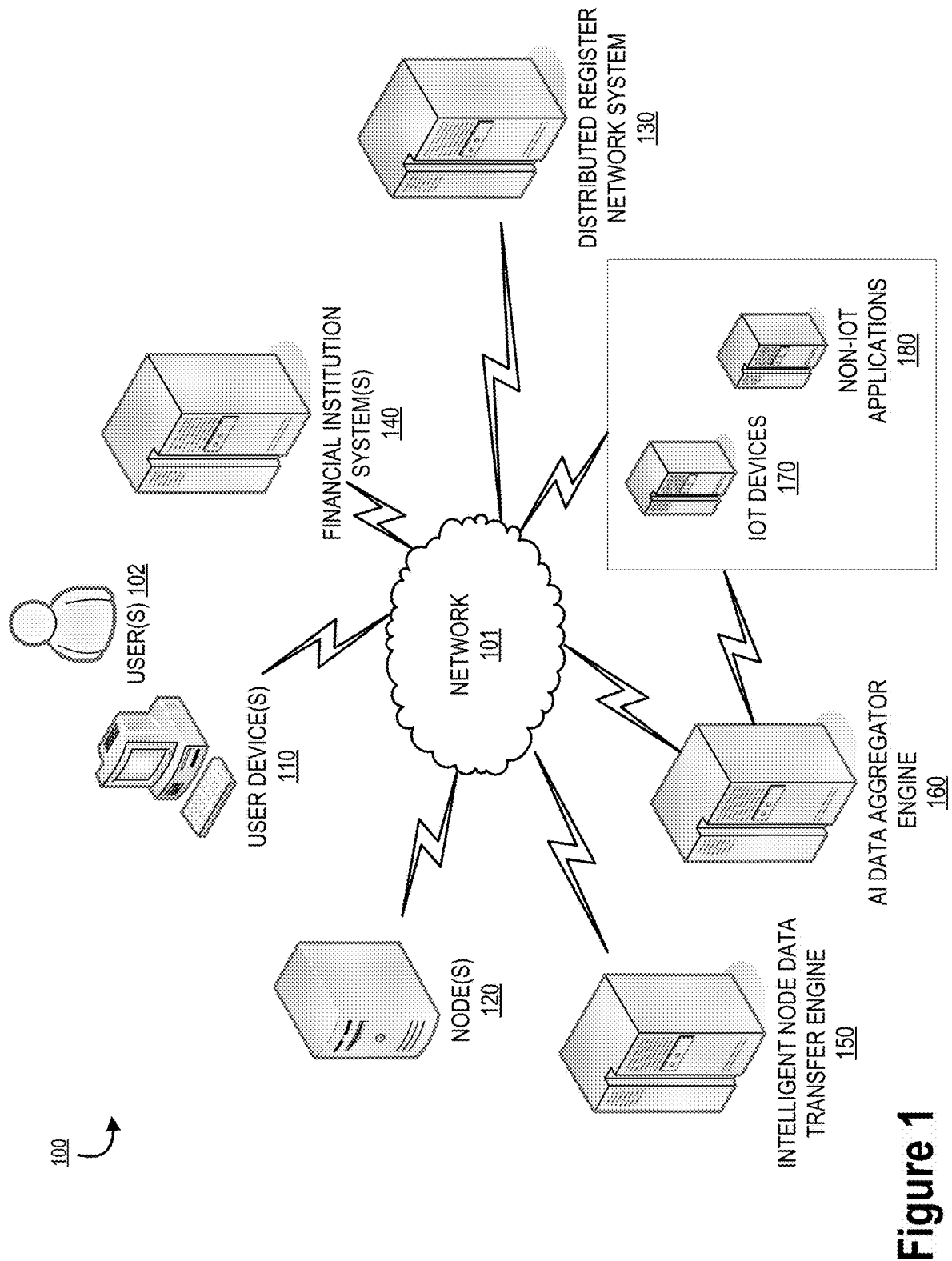
Figure 2:
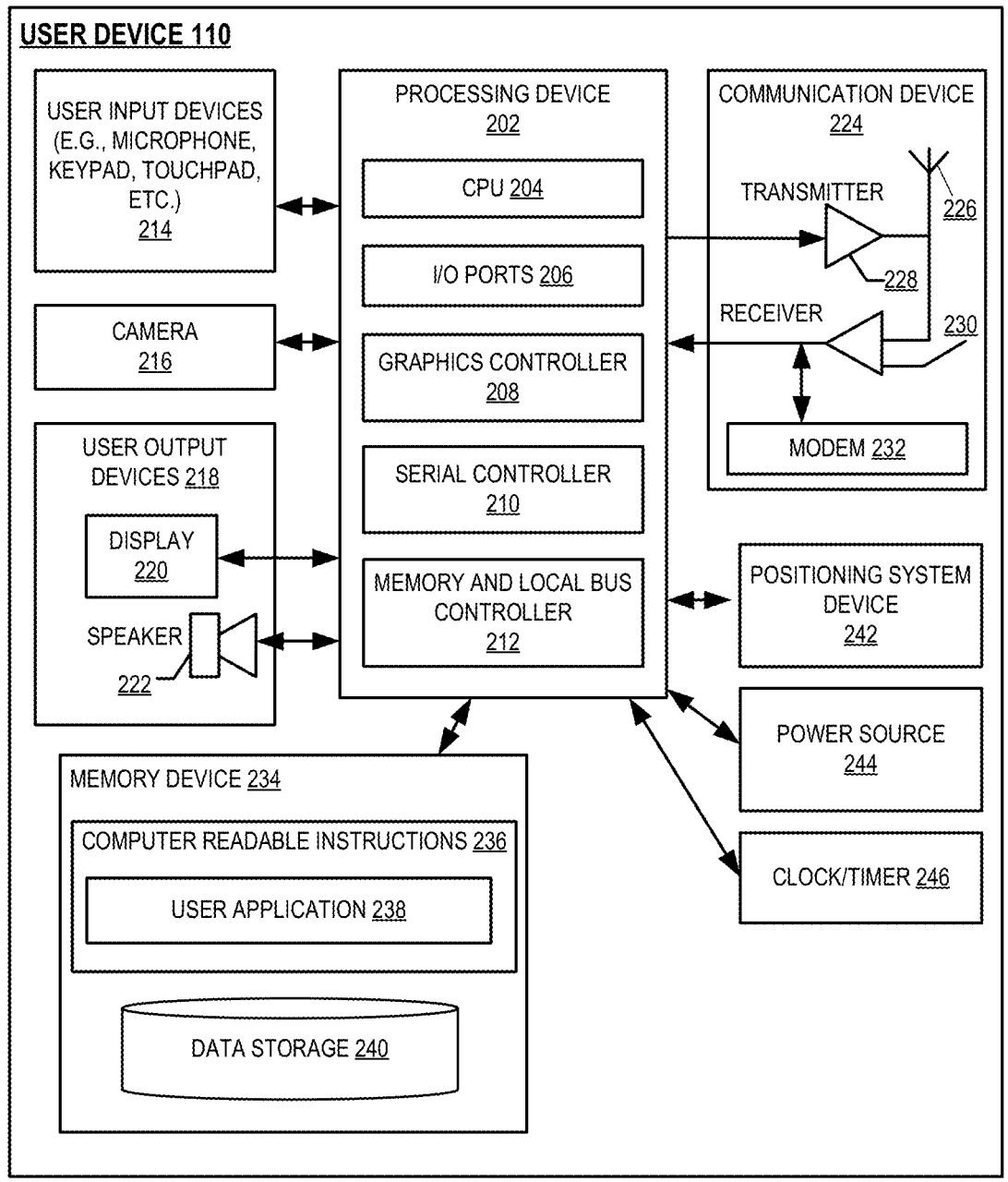
Figure 3:
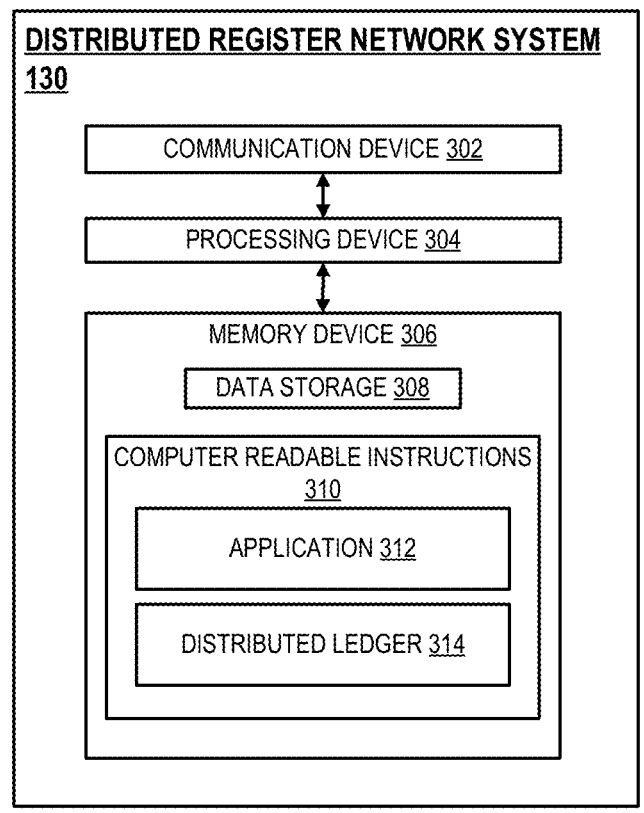
Figure 4A:
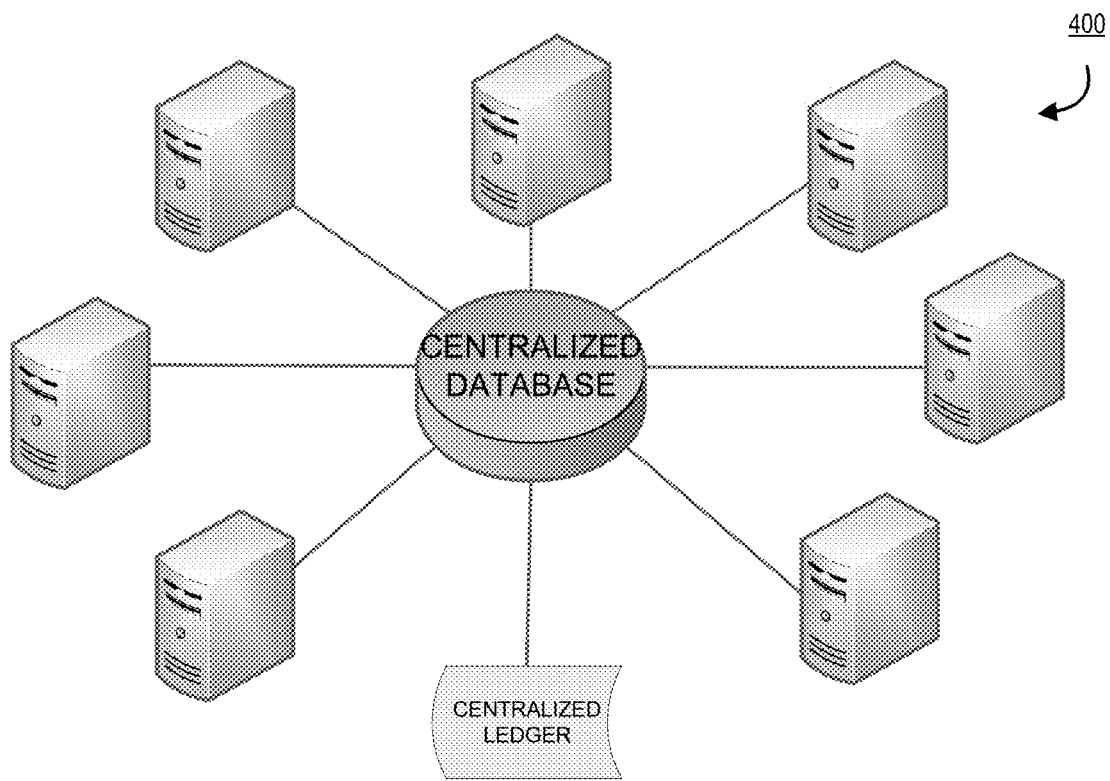
Figure 4B:
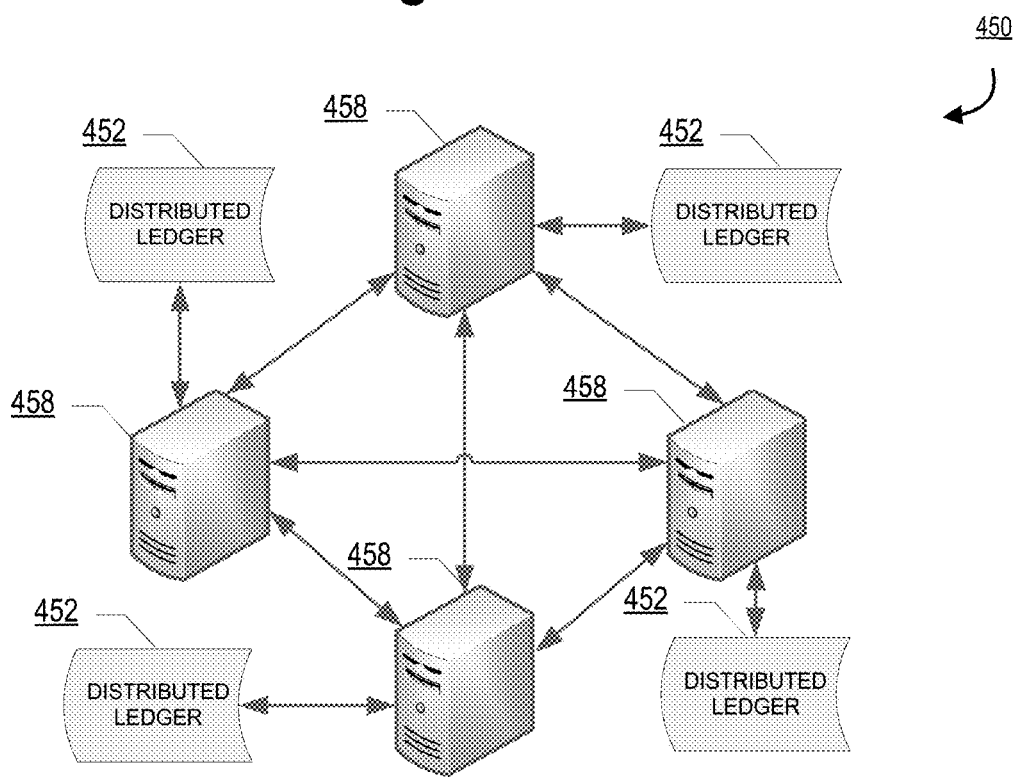
Figure 5:
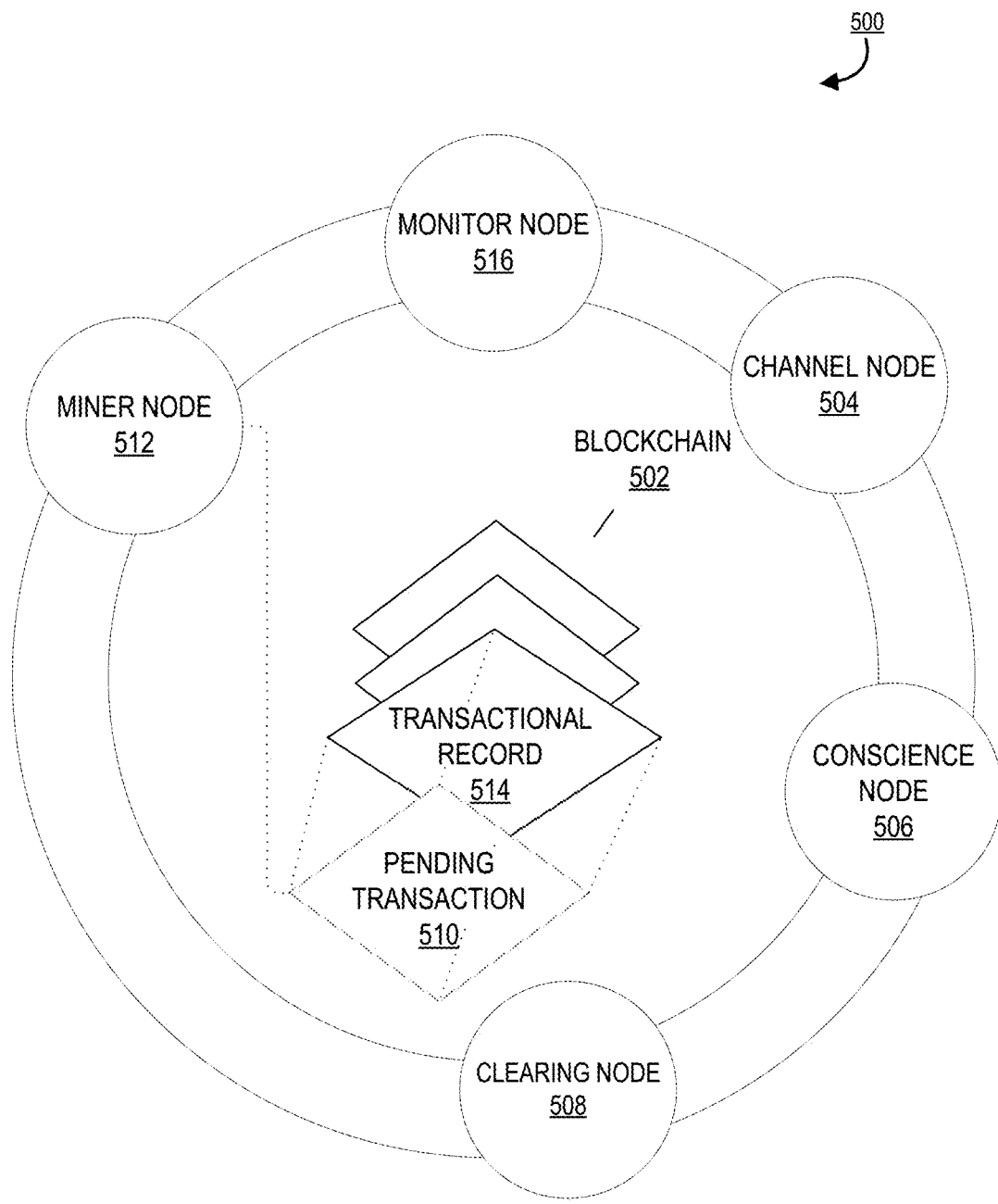
Figure 6:
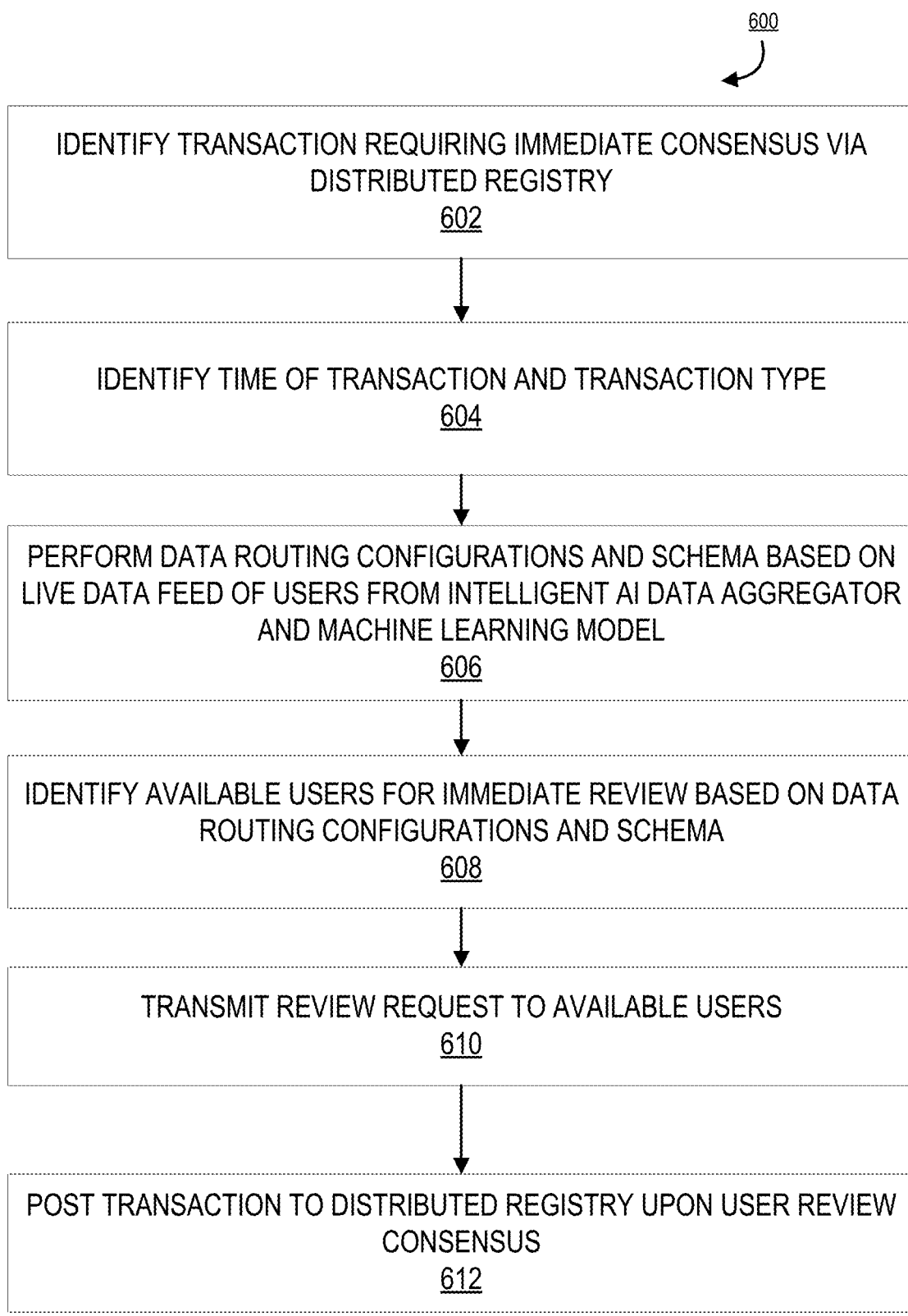
Figure 7:
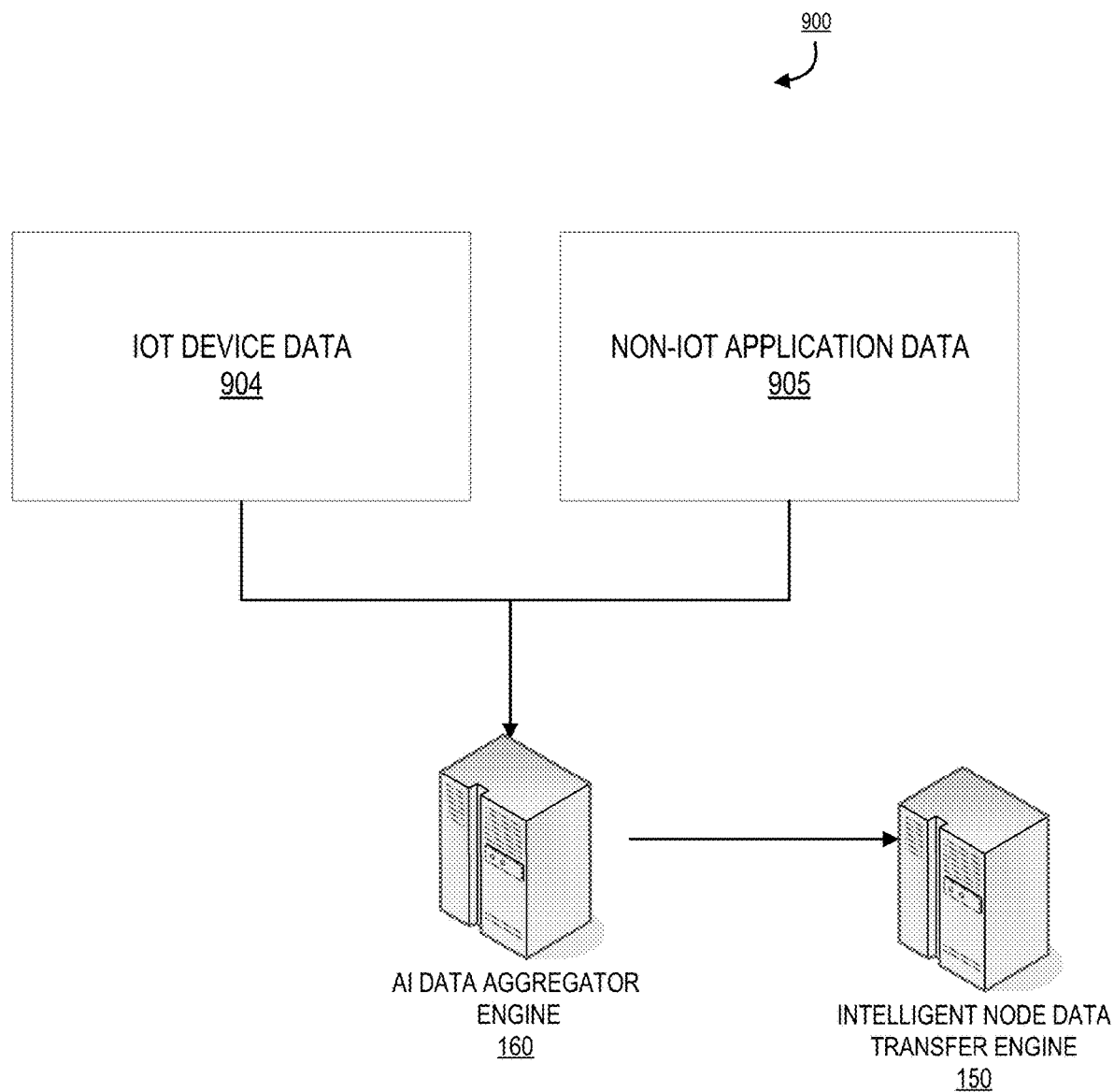
Figure 8:
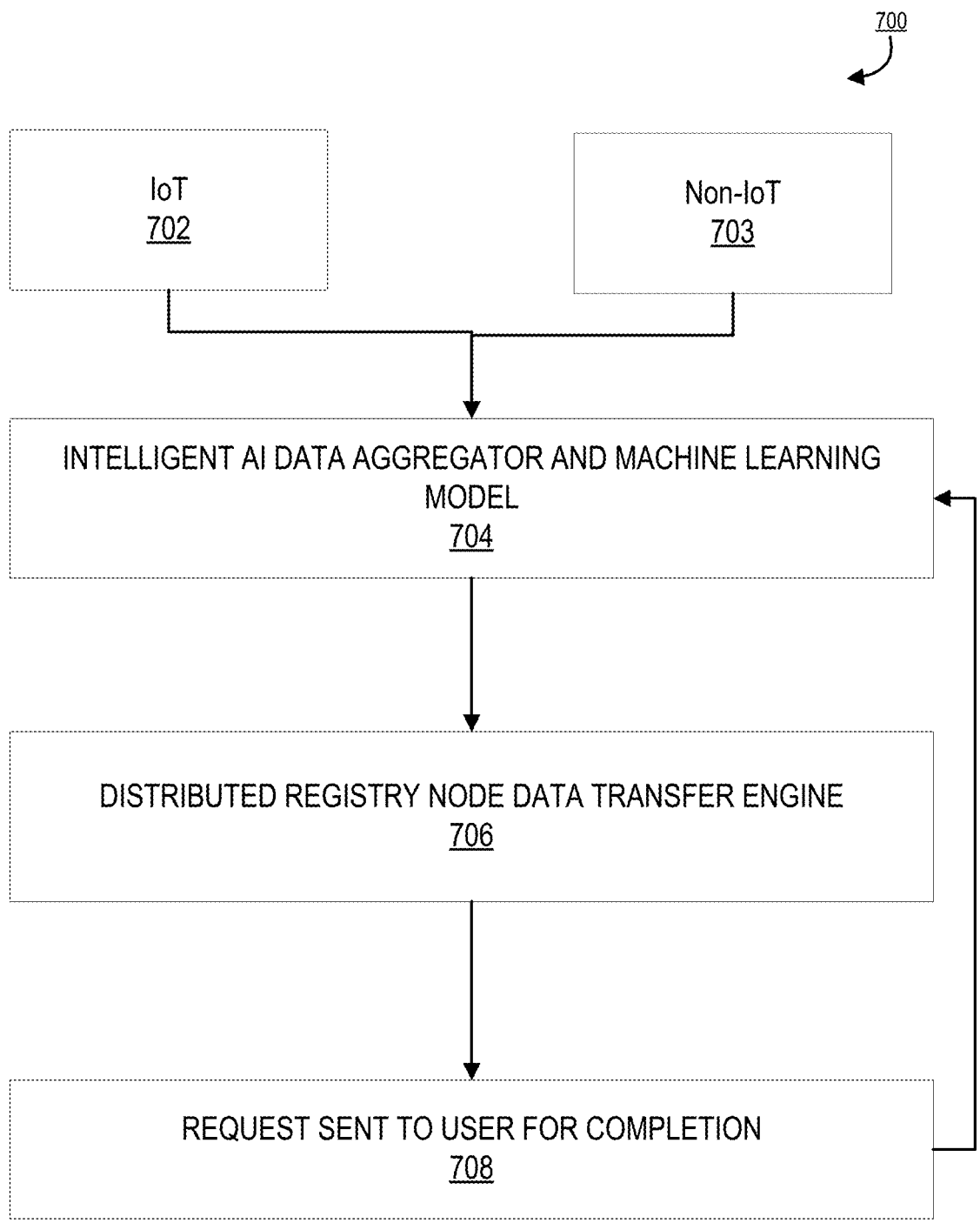
Figure 9:
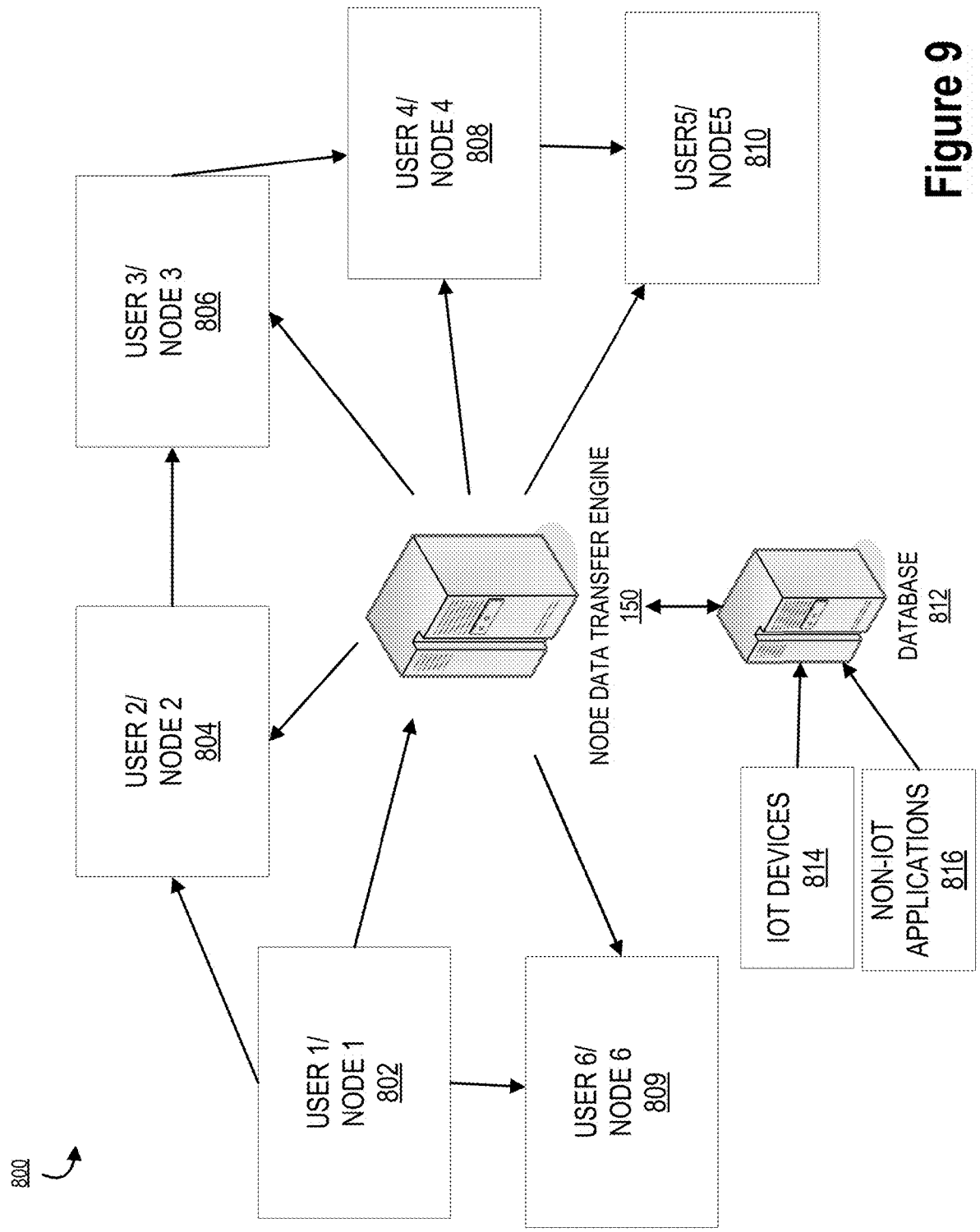

Having thus described embodiments of the invention in general terms, reference will now be made to the accompanying drawings, wherein:

FIG. 1 provides a distributed register intelligent node transfer system environment, in accordance with one embodiment of the invention;

FIG. 2 provides a block diagram of a user device, in accordance with one embodiment of the invention;

FIG. 3 provides a block diagram of the distributed register distributed network system, in accordance with one embodiment of the invention;

FIG. 4A provides a centralized database architecture environment, in accordance with one embodiment of the invention;

FIG. 4B provides a high level distributed register system environment architecture, in accordance with one embodiment of the invention;

FIG. 5 provides a high level process flow illustrating node interaction within a distributed register system environment architecture, in accordance with one embodiment of the invention;

FIG. 6 provides a block diagram illustrating identification and communication with available nodes for consensus, in accordance with one embodiment of the invention;

FIG. 7 provides a high level process map illustrating identification of user node availability, in accordance with one embodiment of the invention;

FIG. 8 provides a high level process map illustrating implementation the distributed register intelligent node distribution, in accordance with one embodiment of the invention; and FIG. 9 provides a detailed flow chart illustrating system interaction for implementation of the distributed register intelligent node distribution, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, entertainment devices, laptop computers, cameras, video recorders, audio/video player, radio, global positioning system (GPS) devices, or any combination of the aforementioned. In some embodiments, a device may refer to an entity's computer system, platform, servers, databases, networked devices, or the like. The device may be used by the user to access the system directly or through an application, online portal, internet browser, virtual private network, or other connection channel. The device may be a computer device within a network of connected computer devices that share one or more network storage locations.

As used herein, the term "computing resource" or "computing hardware" may be used to refer to elements of one or more computing devices, networks, or the like available to be used in the execution of tasks or processes. A computing resource may include processor, memory, or network bandwidth and/or power used for the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison or nodes of a distributed computing cluster).

A "user" as used herein may refer to any individual that may be a node or may be required to review or approve a transaction for posting. In some embodiments, a user may have access to a computing device user, a phone user, a mobile device application user, and may be an individual such as a system operator, database manager, a support technician, and/or employee of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

In accordance with embodiments of the invention, the term "entity" may be used to include any organization or collection of users that may interact with the system and/or a distributed register system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module (such as the robotic process automation module and/or the entity platform described herein) may monitor a user input into the system. In further embodiments, the system may store said user input during an interaction in order to substantially replicate said user input at another time.

As used herein, a "connection" or an "interaction" may refer to any communication between one or more users, one or more entities or institutions, and/or one or more devices, nodes, clusters, or systems within the system environment described herein. For example, an interaction may refer to a transfer of data between systems or devices, an accessing of stored data by one or more devices, a transmission of a requested task, a reporting and correction of an error, or the like. In another example, an interaction may refer to a user interaction with a user device through a user interface in order to connect or communicate with an entity and/or entity system to complete an operation (e.g., request a transfer of funds from an account, complete a form, or the like).

The term "distributed register" as used herein, refer to an electronic ledger, such as a distributed register or blockchain of data records which are authenticated by a federated consensus protocol. Multiple computer systems within the distributed register, referred to herein as "nodes" or "compute nodes," each comprise a copy of the entire ledger of records. Nodes may write a data "block" to the distributed register, the block comprising data regarding a transaction, said blocks further comprising data and/or metadata. In some embodiments, only miner nodes may write transactions to the distributed register. In other embodiments, all nodes have the ability to write to the distributed register. In some embodiments, the block may further comprise a time stamp and a pointer to the previous block in the chain. In some embodiments, the block may further comprise metadata indicating the node that was the originator of the transaction. In this way, the entire record of transactions is not dependent on a single database which may serve as a single point of failure; the distributed register will persist so long as the nodes on the distributed register persist. A "private distributed register" or "permissioned distributed register" is a distributed register in which only authorized nodes may access the distributed register. In some embodiments, nodes must be authorized to write to the distributed register. In some embodiments, nodes must also be authorized to read from the distributed register. Once a transactional record is written to the distributed register, it will be considered pending and awaiting authentication by the miner nodes in the distributed register.

A "block" as used herein may refer to one or more records of a file with each record comprising data for transmission to a server. In some embodiments, the term record may be used interchangeably with the term block to refer to one or more transactions or data within a file being transmitted. In particular, the distributed register begins with a genesis block and is subsequently lengthened by appending blocks in series to the genesis block. Generally, the data within each block within the distributed register may not be modified by the nodes of the distributed register; data may only be added through the addition of a block to the last block in the distributed register. Each block added to the distributed register may comprise a timestamp and a pointer to the previous block in the distributed register. In this way, the distributed register may provide an immutable record of data records over a period of time. In some embodiments, in order for a new block to be added to the distributed register, a pending data record may be proposed to be added to the distributed register. The nodes may then, via a "consensus algorithm" or "consensus mechanism," come to a consensus as to the contents of the data in the distributed register. Once a consensus has been reached by the nodes that the pending data record is valid, the nodes append the data record to the last block in the distributed register. In this way, each node maintains a validated copy of the distributed register such that the distributed register may remain accessible even if one or more nodes become unavailable (e.g. a node is offline due to maintenance, malfunction, or the like) and may further account for divergence from the true copy of the distributed register which may occur at the node level (e.g. a copy of the distributed register on a particular node becomes invalid due to data corruption, malicious editing, and the like). In other words, the consensus mechanism ensures that, over time, each node hosts a copy of the distributed register that is consistent with the other nodes.

Embodiments of the invention as described herein may utilize one, several, or a combination (i.e. hybrid) of a number of different consensus algorithms to ensure the integrity of the data within the distributed register. In some embodiments, the consensus mechanism may be a "proof of work" ("PoW") algorithm, in which the nodes perform a series of calculations to solve a cryptographic puzzle. For instance, in order to validate a pending data record, the nodes may be required to calculate a hash via a hash algorithm (e.g. SHA256) which satisfies certain conditions set by the system. Calculating a hash in this way may be referred to herein as "mining," and thus a node performing the mining may be referred to as "miners" or "miner nodes."

Embodiments of the invention provide a technical solution to a problem by utilizing distributed register systems in a nonconventional way. Unlike a more traditional centralized approach to distributed register regulation, wherein significant delays and out of place transactions may occur because of user delay in approving transaction and thus reaching consensus, the present invention implements a change to the architecture of a distributed register for distribution to user nodes that are available in real-time for instant transaction review and consensus, thus eliminating delay and misplaced blocks on the register.

In distributed register network systems, transaction will be to passed to all node users from block chain. In case of private distributed registers, if user nodes are spread across multiple locations and various countries then immediate responses from each node is challenging. A delay in transaction completion is not acceptable in every scenario.

The invention collects user activity data from Internet-of-Things (IoT) devices and non-Internet-of-Things (non-IoT) applications to identify user activity and stores the activity within a database. The IoT devices may include cameras, card scanners, alarm clocks, weather updates, and the like associated with a user at a user place of employment or a user place of validation of a block on the distributed registry. The non-IoT applications may include any applications such as outside applications, computer applications, or the like. The system then develops various user data routing configuration and schema based on live data feed for identification of user nodes for transaction consensus and posting on a private distributed register.

As such, the intelligent node data transfer engine receives transaction from any node and utilizes the artificial intelligence (AI) data aggregator engine to dynamically identify and communicate to a list of user nodes who can complete the transaction without any delay.

For new transaction request types whose user prediction data is not available from system data, the intelligent node data transfer engine directly extracts users from various IoT device data, non-IoT applications, and from workstation activities to complete the transaction without any delay. The system saves each transaction, user node details, and user responses in a database for future predictions for block consensus and position. Furthermore, if required the system may operate offline or online given the transaction requirements.

As described above, in distributed register network systems all nodes or users have to approve transaction to save it on the block, sometimes the users may not be present to approve, which causes the request or transaction to be held or delayed, which isn't acceptable in some scenarios.

The invention, via a machine learning algorithm using extracted IoT device and non-IoT application data may identify and show a list of users that will be able to immediately review/approve request based on availability. As such, the system generates a user date schema based on user live data feed for determination of user availability for review/approval.

Once the list of users is dynamically identify that can immediately approve the system may transmit the review request to those available users. The system then saves the schema associated with each user, their availability based on time, and their response for subsequent approvals. In this way, the system changes the approval architecture for efficient routing to nodes for approval.

FIG. 1 provides a system that includes specialized systems and devices communicably linked across a distributive network of nodes required to perform the functions of implementing the decentralized distributed register regulation architecture as described herein. FIG. 1 provides a distributed register intelligent node transfer system environment 100, in accordance with one embodiment of the present invention. As illustrated in FIG. 1, the distributed register network system 130 is operatively coupled, via a network 101 to the user device 110, nodes 120, the financial institution system 140, the AI data aggregator engine 160, and the intelligent node data transfer engine 150. In some embodiments, the AI data aggregator engine 160 is also operatively coupled via a network 101 to IoT devices 170 and non-IoT applications 180 that may also be coupled to the other systems and devices on the network 101. In this way, the distributed register network system 130 can send information to and receive information from the user device 110, nodes 120, financial institution system 140, AI data aggregator engine 160, and the intelligent node data transfer engine 150. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual that reviews and authorizes or otherwise approves applications for posting on a network, such as a distributed register. In some embodiments a user 102 is a user or reviewing or providing a consensus for completing a transaction to be recorded on a distributed register. In yet other embodiments, the user 102 is an individual associated with a regulatory entity or agency. In some embodiments, the user 102 has a user device 110, such as a mobile phone, tablet, or the like that may interact with and control the recordation and validation of blocks on the distributed register through interaction with the devices and systems of the environment 200.

It is understood that the servers, systems, and devices described herein illustrate one embodiment of the invention. It is further understood that one or more of the servers, systems, and devices can be combined in other embodiments and still function in the same or similar way as the embodiments described herein.

The intelligent node data transfer engine 150 may receive transaction information for any node 120 on the distributed register. The intelligent node data transfer engine 150 may communicate with the AI data aggregator engine which may extract data about users 120 form user associated IoT devices 170 and non-IoT applications 180 associated with the user 102 and the user devices 110. The intelligent node data transfer engine 150 may further communicate the identified users or nodes for reviewing the transaction and allow for review of the transaction in real-time for instant review and posting to the distributed registry system 130.

In order for the intelligent node data transfer engine 150 to identify the users 102 and nodes 120 for instant review of the transaction, the intelligent node data transfer engine 150 must identify the users 102 that are available and able to perform the review at that time. The AI data aggregator engine 160 determines user 102 availability for instant review of the transaction. The AI data aggregator engine 160 may perform online and offline analysis to identify the user 102 availability. The availability may be based on historic data or real-time data associated with the user 102 typical available time based on work schedule, tendencies, or the like. Furthermore, the AI data aggregator engine 160 may extract data from IoT devices 170 and non-IoT applications 180 to identify the user 102 current availability.

The IoT devices 170 may include any IoT device that may provide an indication of the user 102 location with respect to his/her user device 110 at his/her workstation for completion of a review of the transaction. These may include cameras, badge scanning devices, applications, clocks, IoT devices at the entity identifying user location, weather patterns, traffic patterns or the like that may modify the user work period. Non-IoT applications may include any online or offline application that may indicate the user 102 is at his/her user device 110 available for reviewing the transaction.

In some embodiments, the operating environment may comprise one or more IoT devices 170 and non-IoT applications 180. The IoT device 170 may refer to an appliance, vehicle, computing accessory, wearable device, or other type of smart device which may support connectivity, while the non-IoT applications 108 may comprise non-IoT applications 108 indicative of user location and activity at his/her workstation. Accordingly, the IoT device 170 and, in some instances non-IoT applications 180 may also comprise a processing device operatively coupled to the communication device and a memory device comprising data storage and computer readable instructions. The computer readable instructions may comprise an IoT application which may be configured to instruct the processing device to execute certain functions over the network 101, such as interacting with the entity computing system and/or the user device 110.

The communication device, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the IoT device 170, and in some instances the non-IoT application 180 may also include a communication interface device that may be connected by a hardwire connection to the resource distribution device. The interface device may comprise a connector such as a USB, SATA, PATA, SAS or other data connector for transmitting data to and from the IoT device 170 and the non-IoT application 180.

As described above, the IoT device 170 may be one or more of various types of "smart devices." For example, the IoT device 170 may be a machine such as an automobile, manufacturing device, warehouse devices, material handling system, conveyor system, robotics or the like; appliances such as refrigerators, washer/dryers, dish washers, or the like; home entertainment devices or systems such as set top boxes, entertainment systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of IoT devices 170 or smart devices provided herein is not exhaustive such that the IoT device 170 may be any device that includes a communication interface or module, software and/or hardware that allow the device to communicate data and/or information related to the device with other devices and/or systems over network.

The IoT device 170 may also have a control system for controlling the physical operation of the device. The control system may comprise one or more sensors for detecting operating conditions of the various mechanical and electrical systems that comprise the IoT device 170 or of the environment in which the IoT device 170 is used. The sensors may communicate with the processing device to provide feedback to the operating systems of the device. The control system may also comprise metering devices for measuring performance characteristics of the IoT device 170. The control system may also comprise controllers such as programmable logic controllers (PLC), proportional integral derivative controllers (PID) or other machine controllers. The IoT device 170 may also comprise various electrical, mechanical, hydraulic or other systems that perform various functions of the IoT device 170. These systems may comprise, for example, electrical circuits, motors, compressors, or any system that enables functioning of the IoT device 170.

FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like, one or more chips, and the like. The processing device 202 may further include a central processing unit 204, input/output (I/O) port controllers 206, a graphics controller or GPU 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with content provided from an entity. In some embodiments, the user application 238 further includes a client for managing distributed register regulatory operations either manually or using smart contracts. The user application 238 may also allow the user to view and manipulate data and perform actions on the distributed register as described herein.

The processing device 202 may be configured to use the communication device 224 to communicate with one or more other devices on a network 101 such as, but not limited to the distributed register network system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with wireless communication protocols, such as Universal Mobile Telecommunications System (UMTS), CDMA2000, wideband CDMA (WCDMA) and/or time division-synchronous CDMA (TD-SCDMA), and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes a financial institution system 140 (as illustrated in FIG. 1) which is connected to the user device 110, the nodes 120, the distributed register network system 130, the AI data aggregator engine 160, and the intelligent node data transfer engine 150 and may be associated with one or more financial institutions or financial entities. In this way, while only one financial institution system 140 is illustrated in FIG. 1, it is understood that multiple network systems may make up the system environment 100. The financial institution system 140 generally comprises a communication device, a processing device, and a memory device. The financial institution system 140 comprises computer-readable instructions stored in the memory device, which in one embodiment includes the computer-readable instructions of a financial institution application. The financial institution system 140 may communicate with the user device 110, the nodes 120, the distributed register network system 130, AI data aggregator engine 160, and the intelligent node data transfer engine 150 to, for example, complete and post transactions on the distributed register.

The nodes 120, AI data aggregator engine 160, and the intelligent node data transfer engine 150 comprise the same or similar features as the user device 110 and the financial institution system 140. In some embodiments, the nodes 120 may be user devices 110 forming a plurality of networked devices participating in a distributed register environment. The intelligent node data transfer engine 150 and the AI data aggregator engine 160 are may be maintained by an entity such as a regulatory agency or financial entity for regulating data on the distributed register and ensuring node review and processing health via the processes described herein.

FIG. 3 provides a block diagram of the distributed register network system 130, in accordance with one embodiment of the invention. The distributed register network system 130 generally comprises a communication device 302, a processing device 304, and a memory device 306. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 306 is operatively coupled to the communication device 302 and the memory device 306. The processing device 304 uses the communication device 302 to communicate with the network 101 and other devices on the network 101, such as, but not limited to the user device 110, the nodes 120, the financial institution system 140, AI data aggregator engine 160, and the intelligent node data transfer engine 150. As such, the communication device 302 generally comprises a modem, server, or other device for communicating with other devices on the network 101.

As further illustrated in FIG. 3, the distributed register network system 130 comprises computer-readable instructions 310 stored in the memory device 306, which in one embodiment includes the computer-readable instructions 310 of a distributed register application 312. In some embodiments, the memory device 306 includes data storage 308 for storing data related to the system environment, but not limited to data created and/or used by the distributed register application 312.

Embodiments of the distributed register network system 130 may include multiple systems, servers, computers or the like maintained by one or many entities. FIG. 3 merely illustrates one of those systems that, typically, interacts with many other similar systems to form the distributed register. The distributed register network system 130 will be outlined below in more detail with respect to FIGS. 4-5. In some embodiments, financial institution systems may be part of the distributed register. Similarly, in some embodiments, the distributed register network system 130 is part of a financial institution system 140. In other embodiments, the financial institution system 140 is distinct from the distributed register network system 130. The distributed register network system 130 may communicate with the financial institution system 140 via a secure connection generated for secure encrypted communications between the two systems.

In one embodiment of the distributed register network system 130 the memory device 306 stores, but is not limited to, a distributed register application 312 and a distributed ledger 314. In some embodiments, the distributed ledger 314 stores data including, but not limited to, at least portions of a transaction record. In one embodiment of the invention, both the distributed register application 312 and the distributed ledger 314 may associate with applications having computer-executable program code that instructs the processing device 304 to operate the network communication device 302 to perform certain communication functions involving described herein. In one embodiment, the computer-executable program code of an application associated with the distributed ledger 314 and distributed register application 312 may also instruct the processing device 304 to perform certain logic, data processing, and data storing functions of the application.

The processing device 304 is configured to use the communication device 302 to gather data, such as data corresponding to transactions, blocks or other updates to the distributed ledger 314 from various data sources such as other distributed register network system. The processing device 304 stores the data that it receives in its copy of the distributed ledger 314 stored in the memory device 306.

FIG. 4A illustrates a centralized database architecture environment 400, in accordance with one embodiment of the present invention. The centralized database architecture comprises multiple nodes from one or more sources and converge into a centralized database. The system, in this embodiment, may generate a single centralized ledger for data received from the various nodes. FIG. 4B provides a general distributed register system environment architecture 450, in accordance with one embodiment of the present invention. Rather than utilizing a centralized database of data for instrument conversion, as discussed above in FIG. 4A, various embodiments of the invention may use a decentralized distributed register configuration or architecture as shown in FIG. 4B.

A distributed register is a distributed database that maintains a list of data blocks, such as real-time resource availability associated with one or more accounts or the like, the security of which is enhanced by the distributed nature of the distributed register. A distributed register typically includes several nodes, which may be one or more systems, machines, computers, databases, data stores or the like operably connected with one another. In some cases, each of the nodes or multiple nodes are maintained by different entities. A distributed register typically works without a central repository or single administrator. One well-known application of a distributed register is the public ledger of transactions. The data blocks recorded in the distributed register are enforced cryptographically and stored on the nodes of the distributed register.

A distributed register provides numerous advantages over traditional databases. A large number of nodes of a distributed register may reach a consensus regarding the validity of a transaction contained on the transaction ledger. As such, the status of the instrument and the resources associated therewith can be validated and cleared by one participant.

The distributed register system typically has two primary types of records. The first type is the transaction type, which consists of the actual data stored in the distributed register. The second type is the block type, which are records that confirm when and in what sequence certain transactions became recorded as part of the distributed register. Transactions are created by participants using the distributed register in its normal course of business, for example, when someone sends cryptocurrency to another person, and blocks are created by users known as "miners" who use specialized software/equipment to create blocks. In some embodiments, the distributed register system is closed, as such the number of miners in the current system are known and the system comprises primary sponsors that generate and create the new blocks of the system. As such, any block may be worked on by a primary sponsor. Users of the distributed register create transactions that are passed around to various nodes of the distributed register. A "valid" transaction is one that can be validated based on a set of rules that are defined by the particular system implementing the distributed register. For example, in the case of cryptocurrencies, a valid transaction is one that is digitally signed, spent from a valid digital wallet and, in some cases that meets other criteria.

As mentioned above and referring to FIG. 4B, a distributed register system 450 is typically decentralized—meaning that a distributed ledger 452 (i.e., a decentralized ledger) is maintained on multiple nodes 458 of the distributed register 450. One node in the distributed register may have a complete or partial copy of the entire ledger or set of transactions and/or blocks on the distributed register. Transactions are initiated at a node of a distributed register and communicated to the various nodes of the distributed register. Any of the nodes can validate a transaction, add the transaction to its copy of the distributed register, and/or broadcast the transaction, its validation (in the form of a block) and/or other data to other nodes. This other data may include time-stamping, such as is used in cryptocurrency distributed registers. In some embodiments, the nodes 458 of the system might be financial institutions that function as gateways for other financial institutions. For example, a credit union might hold the account, but access the distributed system through a sponsor node.

Various other specific-purpose implementations of distributed registers have been developed. These include distributed domain name management, decentralized crowd-funding, synchronous/asynchronous communication, decentralized real-time ride sharing and even a general purpose deployment of decentralized applications.

However, in these standard distributed register systems, transaction will be to passed to all node users from block chain. In case of private distributed registers, if user nodes are spread across multiple locations and various countries then immediate responses from each node is challenging. A delay in transaction completion is not acceptable in every scenario. The present invention solves this problem with the introduction of the intelligent node data transfer engine 150 and the AI data aggregator engine 160 to the architecture.

FIG. 5 provides a high level process flow illustrating node interaction within a distributed register system environment architecture 500, in accordance with one embodiment of the present invention. As illustrated and discussed above, the distributed register system may comprise at least one or more nodes used to generate blocks. The nodes as discussed with respect to FIG. 5 may be the nodes 120 of the system environment 100 discussed in FIG. 1. In some embodiments, the channel node 504, payments node 506, monitor node 516 or the clearing node 508 may publish a pending transaction 510 to the distributed register 502. At this stage, the transaction has not yet been validated by the miner node(s) 512, and the other nodes will delay executing their designated processes. The miner node 512 may be configured to detect a pending transaction 510. Upon verifying the integrity of the data in the pending transaction 510, the miner node 512 validates the transaction and adds the data as a transactional record 514, which is referred to as a block to the distributed register 502. Once a transaction has been authenticated in this manner, the nodes will consider the transactional record 514 to be valid and thereafter execute their designated processes accordingly. The transactional record 514 will provide information about the transaction processed and transmitted through and metadata coded therein for searchability of the transactional record 514 within a distributed ledger.

In some embodiments, the system may comprise at least one additional miner node 512. The system may require that pending transactions 510 be validated by a plurality of miner nodes 512 before becoming authenticated blocks on the distributed register. In some embodiments, the systems may impose a minimum threshold number of miner nodes 512 needed. The minimum threshold may be selected to strike a balance between the need for data integrity/accuracy (i.e., security/immutability) versus expediency of processing. In this way, the efficiency of the computer system resources may be maximized.

Using the intelligent node data transfer engine 150 and the AI data aggregator engine 160 the system may be able identify nodes of each time or element that are available for one or more authentication or verification tasks. In this way, the system allows for real-time expedited authentication of the transaction.

Furthermore, in some embodiments, a plurality of computer systems are in operative networked communication with one another through a network. The network may be a system specific distributive network receiving and distributing specific network feeds and identifying specific network associated triggers.

In some embodiments, the computer systems represent the nodes of the distributed register, such as the miner node or the like. In such an embodiment, each of the computer systems comprise the distributed register, providing for decentralized access to the distributed register as well as the ability to use a consensus mechanism to verify the integrity of the data therein. In some embodiments, an upstream system and a downstream system are further operatively connected to the computer systems and each other through the network. The upstream system further comprises a ledger and the distributed register. The downstream system further comprises the distributed register and an internal ledger, which in turn comprises a copy of the ledger.

In some embodiments, a copy of distributed register may be stored on a durable storage medium within the computer systems or the upstream system or the downstream system. In some embodiments, the durable storage medium may be RAM. In some embodiments, the durable storage medium may be a hard drive or flash drive within the system.

FIG. 6 provides a block diagram illustrating identification and communication with available nodes for consensus 600, in accordance with one embodiment of the invention. As illustrated in block 602, the process 600 is initiated by identifying a transaction requiring immediate consensus for applying the transaction. In some embodiments, this may be via a distributed registry. In other embodiments, the invention provided herein may be performed on any platform requiring real-time or immediate review and/or approval of a posting.

As illustrated in block 604, the process 600 continues by identifying the time and type of transaction. In this way, the system may identify a time of the transaction and a type of transaction in order to identify users or nodes that may be available for reviewing and posting of the transaction based on that time and the type of transaction.

Next, as illustrated in block 606, the process 600 continues by performing data routing configurations and schema based on live data feed of users from intelligent AI data aggregator and machine learning model. In this way, based on IoT devices and non-IoT applications associated with a user or user surroundings, the system may be able to tell in real-time and/or predict from historic patterning if the user is available at the time for review of the transaction. In some embodiments, the system performs the data routing configurations in an offline mode. In the offline mode, the system predicts user availability based on historic patterning. However, if this is a new transaction or offline mode is otherwise unavailable, the system may resort to online mode and access user information in real-time. As such, the system works and determines available users in an offline state.

As illustrated in block 608, the process 600 continues by identifying the available users for immediate review of the transaction based on data routing configurations and schema. In this way, the system, including the intelligent node data transfer engine and the AI data aggregator may combine to extract and identify the users that are currently available for review of the transaction. This may be the users that are at their workstations actively working on their user device at the time of transmission of the transaction to the user for review. As such, allowing for instant user review of the transaction for expedited transaction completion and posting time. The data extraction, processing, and transmission with respect to the intelligent node data transfer engine and the AI data aggregator may be described throughout this application.

As illustrated in block 610 the process 600 continues by transmitting the review request to the determined users based on the data routing configuration and schema. In this way, the system may transmit the necessary information about the transaction to the user for review and confirmation. Once transmitted to the user nodes, the system may allow for posting of the transaction to the distributed registry, upon approval and consensus from the user review nodes, as illustrated in block 612.

FIG. 7 provides a high level process map illustrating identification of user node availability 900, in accordance with one embodiment of the invention. In order for the system to generate the data routing configurations and schema, the system may extract data to build a database of user information. This may be done to determine and predict times that the user will be available for reviewing the transaction. The data may be extracted from IoT devices and non-IoT applications.

As illustrated in block 904, IoT data may included any data received or extracted from an IoT device. The IoT devices may include cameras, card scanners, alarm clocks, weather updates, and the like associated with a user at a user place of employment or a user place of validation of a block on the distributed registry. The IoT devices may include any IoT device that may provide an indication of the user location with respect to his/her user device at his/her workstation for completion of a review of the transaction. These may include cameras, badge scanning devices, applications, clocks, IoT devices at the entity identifying user location, weather patterns, traffic patterns or the like that may modify the user work period.

The system may extract data from these IoT devices to form IoT data 904 for processing. The data may be used to identify historic trends and patterns with the user to predict the user's availability at the time to review a transaction. In other embodiments, the IoT data 904 may be used in real-time to determine the user's availability at the time to review a transaction.

As illustrated in block 905, non-IoT application data may include any non-IoT applications that may identify the location and activity of the user. The non-IoT application data 905 may include any applications such as outside applications, computer applications, or the like. Furthermore, non-IoT applications may be on-line or off-line.

The IoT device data 904 and the non-IoT application data 905 may be processed via the AI data aggregator engine 160. The AI data aggregator engine 160 may use real-time data and historic data regarding the user to predict the user location at the time of transaction for review. In some embodiments, the AI data aggregator engine 160 may aggregate and perform machine learning analytics on user historic data to identify and predict a location of the user for review of the transaction. In other embodiments, the AI data aggregator engine 160 may identify the user current location and current availability for review of the transaction for posting. Using these two methods, the AI data aggregator engine 160 may identify one or more users for reviewing the transaction prior to posting.

Once the AI data aggregator engine 160 identifies the one or more users, the AI data aggregator engine 160 may communicate these users to the intelligent node data transfer engine 150. The intelligent node data transfer engine 150 may review and confirm the user selections and transmit the transaction information to the users for review.

FIG. 8 provides a high level process map illustrating implementation the distributed register intelligent node distribution 700, in accordance with one embodiment of the invention. As illustrated, IoT device data from block 702 and non-IoT application data 703 may be extracted and compiled for analysis of user status. As illustrated in block 704, the process 700 continues by transmitting the IoT device data and the non-IoT application data to the intelligent AI data aggregator that includes a machine learning model. Using the machine learning associated with the AI data aggregator engine, the system may be able to identify the users that are available for review of the transaction at that time. The identified users may be sent to the distributed registry node data transfer engine as illustrated in block 706. The intelligent node data transfer engine may review the users and transmit the request to the user for completion, as illustrated in block 708.

In some embodiments, the system performs the data routing configurations in an offline mode. In the offline mode, the system predicts user availability based on historic patterning. However, if this is a new transaction or offline mode is otherwise unavailable, the system may resort to online mode and access user information in real-time. As such, the system works and determines available users in an offline state.

Finally, the system may monitor the user response time, the user response, and the like and provide feedback back to the AI data aggregator engine and the intelligent node data transfer engine to include that into historic data for that particular user for later determination of transaction reviews.

FIG. 9 provides a detailed flow chart illustrating system interaction for implementation of the distributed register intelligent node distribution 800, in accordance with one embodiment of the invention. To initiate the process 800 User1/Node1 802 may provide a transaction request to the node data transfer engine 150. The node data transfer engine 150 may, depending upon the request, communicate with the AI data aggregator engine and database 812 to gather a list of users that can immediately complete the transaction. In some embodiments, in the case of a request type, the AI data aggregator engine in combination with the node data transfer engine 150 may find users for the transaction based on workstation activities. The data used to identify the users and the users that are active that can immediately complete the transaction is based on data extracted from IoT devices 814 and non-IoT applications 816.

In some embodiments, the system performs the data routing configurations in an offline mode. In the offline mode, the system predicts user availability based on historic patterning. However, if this is a new transaction or offline mode is otherwise unavailable, the system may resort to online mode and access user information in real-time. As such, the system works and determines available users in an offline state.

Next, the node data transfer engine 150 may transmit the transaction to the users that have been identified as being available for reviewing the transaction. In the embodiment illustrated in FIG. 9, the node data transfer engine 150 may transmit the request, the transaction, and the review information to User2/Node2 804, User3/Node3 806, User4/Node4 808, User5/Node5, and User6/node6 809 for confirmation. Upon user and node review and acceptance, the transaction may be posted to a distributed register or the like. The system may save all node users and all data associated with the transaction for each transaction and each node review for feedback.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of optional steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent node transfer, the system comprising:
   a plurality of nodes participating in a distributed register network comprising a plurality of distributed registers, the plurality of distributed registers; and
   a controller assigned for managing regulation of the distributed register network, the controller comprising at least one memory device with computer-readable program code stored thereon, at least one communication device connected to a network, and at least one processing device, wherein the at least one processing device is configured to execute the computer-readable program code to:
      communicate with Internet-of-Things (IoT) devices and non-IoT applications comprising on-line applications and off-line applications associated with a user and a user workstation;
      aggregate and process IoT device data associated with the IoT devices and non-IoT application data associated with the non-IoT applications via an artificial intelligence (AI) data aggregator engine to generate user data for identification of availability for review;
      store the user data associated with the IoT devices and the non-IoT applications for identification of availability for review;
      receive a request requiring immediate review and consensus for posting;
      generate a user data routing configuration and schema based on the stored user data and real-time data extracted from the IoT devices and the non-IoT applications, wherein the user data routing configuration and schema is a transmission list of users available and authorized for reviewing the request immediately;
      assign permission, upon authentication, for user review of the request for posting; and
      post, upon the user review, the request to a register.

2. The system of claim 1, wherein storing user data associated with the IoT devices and non-IoT applications for identification of availability for review further comprises performing machine learning analytics on the user data to identify trends in user availability at the user workstation based on time of day and day of week.

3. The system of claim 1, wherein receiving the request requiring immediate review and consensus for posting further comprises receiving a request for posting a transaction on a private distributed register network system.

4. The system of claim 1, further comprising an intelligent node data transfer engine for receiving the requests from any node and communicating to the assigned permission user the request.

5. The system of claim 1, further comprising the artificial intelligence (AI) data aggregator engine to dynamically identify a list of user nodes comprising users that can complete the request associated with a transaction without any delay and store that list via the user data routing configuration and schema.

6. The system of claim 1, wherein the user workstation comprises a device and a location where the user provides reviews.

7. A computer program product for intelligent node transfer, the computer program product comprising at least one non-transitory computer-readable medium having computer-readable program code portions embodied therein, the computer-readable program code portions comprising:
   an executable portion configured for communicating with Internet-of-Things (IoT) devices and non-IoT applications comprising on-line applications and off-line applications associated with a user and a user workstation;
   an executable portion configured for aggregating and processing IoT device data associated with the IoT devices and non-IoT application data associated with the non-IoT applications via an artificial intelligence (AI) data aggregator engine to generate user data for identification of availability for review;
   an executable portion configured for storing the user data associated with the IoT devices and the non-IoT applications for identification of availability for review;
   an executable portion configured for receiving a request requiring immediate review and consensus for posting;
   an executable portion configured for generating a user data routing configuration and schema based on the stored user data and real-time data extracted from the IoT devices and the non-IoT applications, wherein the user data routing configuration and schema is a transmission list of users available and authorized for reviewing the request immediately;
   an executable portion configured for assigning permission, upon authentication, for user review of the request for posting; and
   an executable portion configured for posting, upon the user review, the request to a register.

8. The computer program product of claim 7, wherein storing user data associated with the IoT devices and non-IoT applications for identification of availability for review further comprises performing machine learning analytics on the user data to identify trends in user availability at the user workstation based on time of day and day of week.

9. The computer program product of claim 7, wherein receiving the request requiring immediate review and consensus for posting further comprises receiving a request for posting a transaction on a private distributed register network system.

10. The computer program product of claim 7, further comprising an intelligent node data transfer engine for receiving the requests from any node and communicating to the assigned permission user the request.

11. The computer program product of claim 7, further comprising the artificial intelligence (AI) data aggregator engine to dynamically identify a list of user nodes comprising users that can complete the request associated with a transaction without any delay and store that list via the user data routing configuration and schema.

12. The computer program product of claim 7, wherein the user workstation comprises a device and a location where the user provides reviews.

13. A computer-implemented method for intelligent node transfer, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
communicating with Internet-of-Things (IoT) devices and non-IoT applications comprising on-line applications and off-line applications associated with a user and a user workstation;
aggregating and processing IoT device data associated with the IoT devices and non-IoT application data associated with the non-IoT applications via an artificial intelligence (AI) data aggregator engine to generate user data for identification of availability for review;
storing the user data associated with the IoT devices and the non-IoT applications for identification of availability for review;
receiving a request requiring immediate review and consensus for posting;
generating a user data routing configuration and schema based on the stored user data and real-time data extracted from the IoT devices and the non-IoT applications,
wherein the user data routing configuration and schema is a transmission list of users available and authorized for reviewing the request immediately;
assigning permission, upon authentication, for user review of the request for posting; and
posting, upon the user review, the request to a register.

14. The computer-implemented method of claim 13, wherein storing user data associated with the IoT devices and non-IoT applications for identification of availability for review further comprises performing machine learning analytics on the user data to identify trends in user availability at the user workstation based on time of day and day of week.

15. The computer-implemented method of claim 13, wherein receiving the request requiring immediate review and consensus for posting further comprises receiving a request for posting a transaction on a private distributed register network system.

16. The computer-implemented method of claim 13, further comprising an intelligent node data transfer engine for receiving the requests from any node and communicating to the assigned permission user the request.

17. The computer-implemented method of claim 13, further comprising the artificial intelligence (AI) data aggregator engine to dynamically identify a list of user nodes comprising users that can complete the request associated with a transaction without any delay and store that list via the user data routing configuration and schema.

* * * * *